United States Patent Office 3,419,423
Patented Dec. 31, 1968

3,419,423
ADDUCTS OF SILICON HYDRIDE POLYSILOXANES AND HYDROLYZABLE SILANES HAVING ALKENYL RADICALS USEFUL FOR RENDERING SUBSTRATES WATER REPELLENT
George J. Quaal, Springfield, Mass., assignor to Dow Corning Corporation, Midland, Mich., a corporation of Michigan
No Drawing. Filed Oct. 9, 1964, Ser. No. 402,959
24 Claims. (Cl. 117—161)

ABSTRACT OF THE DISCLOSURE

A process of treating a substrate with a siloxane copolymer and thereafter curing the treated substrate to provide water repellency. The substrates can include fabrics, paper, glass, wood, leather and masonry products, among others. The siloxane copolymer has a general formula

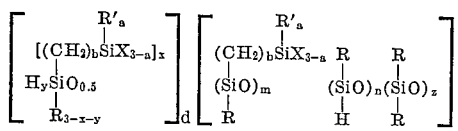

where R and R' are each alkyl, halogenated alkyl, phenyl or haloegnated phenyl, X is —OR″, chlorine atoms, —NR″$_2$, —O(CH$_2$)$_c$OR″, —OOCH, or —OOCR″, R″ is alkyl, $c$ is 1 to 3, $a$ is 0 to 2, $b$ is 2 to 4, $m$ is 2 to 90 mol percent of the silicon atoms, $n$ is 10 to 98 mol percent of the silicon atoms, $z$ is 0 to 88 mol percent of the silicon atoms, $n+m+z$ is 6 to 2000, $d$, $x$ and $y$ are each 0 to 2, and $x+y$ is 0 to 2.

---

This invention relates to siloxane copolymers which have silicon-bonded hydrogen atoms and silicon-containing moieties bonded to the silicon atoms of the siloxane copolymer chain through alkylene radicals. The silicon-containing moieties have readily hydrolyzable groups.

An object of the present invention is to provide siloxane copolymers from silicon hydride siloxane polymers and hydrolyzable silanes having an alkenyl radical.

Another object is to provide a siloxane copolymer which is curable without a catalyst.

Another object is to provide a siloxane copolymer which is a water repellent.

Another object is to provide a one-component water repellent curable at room conditions.

Other objects and advantages will become apparent from the following detailed description of the present invention and appended claims.

This invention relates to a siloxane copolymer of the general formula

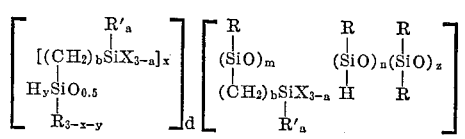

wherein R is a monovalent radical selected from the group consisting of alkyl radicals having from 1 to 12 inclusive carbon atoms, halogenated alkyl radicals having from 3 to 12 inclusive carbon atoms, phenyl radicals and halogenated phenyl radicals; R' is a monovalent radical selected from the group consisting of alkyl radicals having from 1 to 8 inclusive carbon atoms, halogenated alkyl radicals having from 3 to 8 inclusive carbon atoms, phenyl radicals and halogenated phenyl radicals; X is a monovalent radical selected from the group consisting of —OR″ radicals, chlorine atoms, —NR″$_2$ radicals, —O(CH$_2$)$_c$OR″ radicals,

radicals and

radicals, wherein each R″ is a monovalent alkyl radical having from 1 to 3 inclusive carbon atoms, and $c$ has a value from 1 to 3 inclusive; $a$ has an average value of from 0 to 2 inclusive; $b$ has a value from 2 to 4 inclusive; $m$ has a value such that at least 2 mol percent of the silicon atoms have at least one —(CH$_2$)$_b$SiR′$_a$X$_{3-a}$ radicals and not more than 90 mol percent of the silicon atoms have at least one —(CH$_2$)$_b$SiR′$_a$X$_{3-a}$ radical; $n$ has a value such that at least 10 mol percent of the silicon atoms have at least one hydrogen atom bonded to a silicon atom and not more than 98 mol percent of the silicon atoms have at least one hydrogen atom bonded to a silicon atom; $z$ has an average value of from 0 to a maximum value which is such that not more than 88 mol percent of the silicon atoms have two R radicals per silicon atom; the sum of $m+n+z$ is from 6 to 2000; $x$ has an average value of from 0 to 2 inclusive; the sum of $x+y$ is from 0 to 2 inclusive; and $d$ has a value of from 0 to 2 inclusive.

The siloxane copolymers of this invention can be either linear siloxanes, cyclic siloxanes or mixtures of linear siloxanes and cyclic siloxanes. The cyclic siloxanes can be composed of 2 to 90 mol percent of siloxane units of the unit formula

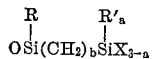

10 to 98 mol percent of siloxane units of the unit formula

and 0 to 88 mol percent of siloxane units of the unit formula R$_2$SiO. The mol percent is based on the total moles of siloxane units present in the composition. One mole of a siloxane unit is equal to the formula weight of the siloxane unit. Other units besides those discussed above can also be present in small amounts, such siloxane units as

OSiH$_2$, HSiO$_{1.5}$ and RSiO$_{1.5}$, are within the scope of the present invention. The linear siloxanes can be composed of the same units as the cyclic siloxanes, namely, 2 to 90 mol percent of siloxane units of the unit formula

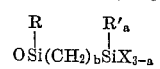

10 to 98 mol percent of siloxane units of the unit formula

and 0 to 88 mol percent of siloxane units of the unit formula R$_2$SiO. The linear siloxanes are terminated by siloxane units of the unit formula

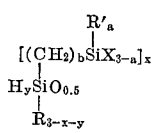

The linear siloxanes are the preferred siloxanes of the invention. The siloxanes of this invention can also be a mixture of linear and cyclic polysiloxanes. These mixtures can have an average formula

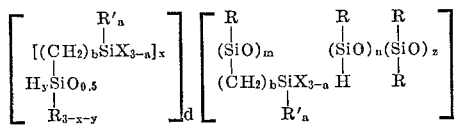

wherein $d$ will vary from 0 to 2. When $d$ is 0, the siloxane copolymers are essentially cyclic polysiloxanes, and when $d$ is 2, the siloxane copolymers are essentially linear polysiloxanes. When the value of $d$ is between 0 and 2, the siloxane copolymers contain both linear polysiloxanes and cyclic polysiloxanes in such a ratio as indicated by $d$. Both the cyclic and linear siloxanes can be polymerized in a random or block structure.

The siloxane copolymers of this invention must contain both

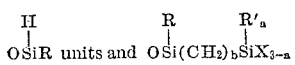

units. In these units, R is a monovalent radical such as alkyl radicals having from 1 to 12 carbon atoms, such as methyl, ethyl, propyl, pentyl, hexyl, octyl, dodecyl, cyclopentyl and cyclohexyl radicals; halogenated alkyl radicals having from 3 to 12 carbon atoms, such as 3,3,3-trifluoropropyl, bromohexyl, chlorocyclohexyl, and 3,3,4,4,5,5,6,6,7,7,8,8,8 - tridecafluorooctyl radicals; phenyl radicals and halogenated phenyl radicals such as dichlorophenyl, fluorophenyl and bromophenyl radicals. In these units, R' is a monovalent radical such as alkyl radicals having from 1 to 8 carbon atoms such as methyl, ethyl, propyl, butyl, hexyl, cyclopentyl, cyclohexyl and octyl radicals; halogenated alkyl radicals having from 3 to 8 carbon atoms, such as 3,3,3-trifluoropropyl, bromocyclopentyl, and 3,3,4,4,5,5,6,6,7,7,8,8-tridecafluorooctyl radicals; phenyl radicals and halogenated phenyl radicals, such as chlorophenyl, dibromophenyl and fluorophenyl radicals. X is a monovalent radical selected from the group consisting of —OR'' radicals wherein R'' is a monovalent alkyl radical, having from 1 to 3 carbon atoms such as methyl, ethyl, n-propyl and isopropyl radicals, such as methoxy, ethoxy, n-propoxy and isopropoxy radicals; —NR''$_2$ radicals where R'' is defined above such as —N(CH$_3$)$_2$, —N(CH$_2$CH$_3$)$_2$,

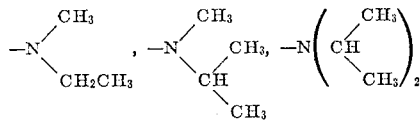

and —N(CH$_2$CH$_2$CH$_3$)$_2$ radicals; —O(CH$_2$)$_c$OR' radicals where R'' is defined above and $c$ is 1, 2, or 3, such as —OCH$_2$OCH$_3$, —OCH$_2$CH$_2$OCH$_2$CH$_3$,

—OCH$_2$CH$_2$OCH$_3$,

—OCH$_2$CH$_2$CH$_2$OCH$_3$, —OCH$_2$CH$_2$OCH$_2$CH$_2$CH$_3$,

and —OCH$_2$OCH$_2$CH$_3$ radicals;

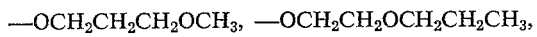

radicals where R'' is defined above such as

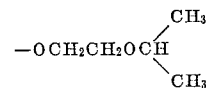

radicals; chlorine atoms and

radicals. In the

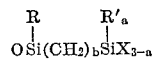

units, $a$ is 0, 1 or 2, preferably, $a$ is 0 or 1. The siloxane copolymer must have at least one hydrolyzable radical, X to be readily curable, thus, $a$ cannot be more than 2. The alkylene radical can be, —CH$_2$CH$_2$—,

—CH$_2$CH$_2$CH$_2$— or —CH$_2$CH$_2$CH$_2$CH$_2$— radicals, thus, $b$ is 2, 3 or 4. Examples of

units are

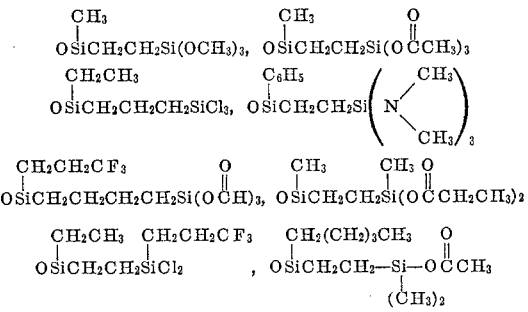

and

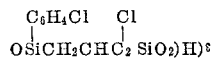

Examples of

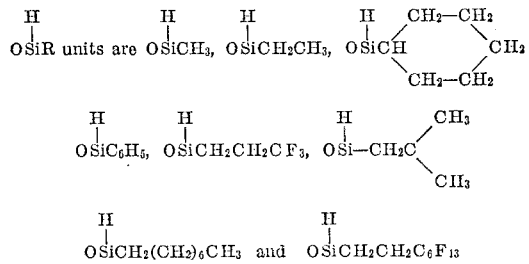

In the R$_2$SiO units, the R is defined above. Examples of R$_2$SiO units are (CH$_3$)$_2$SiO, (CH$_3$)(CH$_3$CH$_2$)SiO, (C$_6$H$_5$)$_2$SiO, C$_6$H$_5$(CH$_3$)SiO, (CF$_3$CH$_2$CH$_2$)(CH$_3$)SiO, (C$_6$H$_{11}$)(CH$_3$)SiO, (C$_6$H$_5$)(CH$_3$CH$_2$) SiO, (CH$_3$CH$_2$)$_2$SiO (C$_6$H$_4$Cl)$_2$SiO, [CH$_3$(CH$_2$)$_{11}$](CH$_3$)SiO and

[CH$_3$(CH$_2$)$_5$]$_2$SiO.

The terminating siloxane units for the linear siloxane have the unit formula

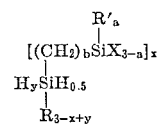

In the terminating siloxane units, the

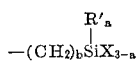

and R are fully defined above. The terminating siloxane units have at least one R radical per unit and can have up to 3 R radicals per unit. The terminating siloxane unit can also have up to two hydrogen atoms bonded directly to the silicon atom per unit, thus, $y$ can have a value from 0 to 2. The terminating siloxane unit can also have up to two

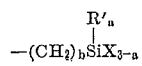

radicals per unit, thus $x$ can have a value from 0 to 2. The sum of $x+y$ can vary from 0 to 2 depending upon the average number of hydrogen atoms, and

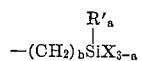

radicals attached to the silicon atom of the terminating siloxane units. Examples of terminating siloxane units are $(CH_3)_3SiO_{0.5}$, $H(CH_3)_2SiO_{0.5}$, $H_2(CH_3)SiO_{0.5}$,

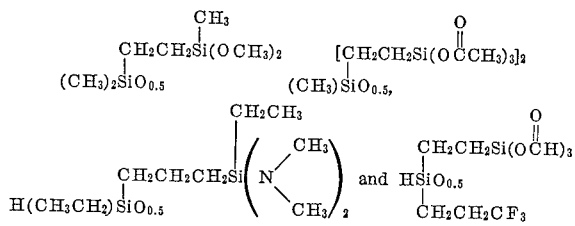

The siloxane copolymers of the invention can be relatively low molecular weight polymers consisting of at least six siloxane units or relatively high molecular weight polymers consisting of up to 2000 siloxane units. The siloxane copolymers with less than six siloxane units do not cure to useable products, and those having more than 2000 siloxane units are not economical to prepare. The most preferred siloxane copolymers contain from 10 to 200 siloxane units.

The siloxane copolymers can be prepared by adding a silane of the formula

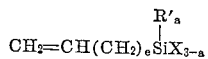

where R′, X, and $a$ are defined above and $e$ has a value of 0, 1 or 2, to a mixture of a platinum catalyst and silicon hydride polysiloxane of the formula

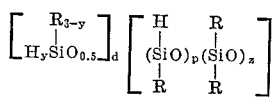

where R, $y$, $z$, and $d$ are defined above and $p$ has a value such that at least 12 mol percent of the silicon atoms have at least one hydrogen atom bonded to a silicon atom. When $e$ has a value greater than 2, the preparation of the siloxane copolymers is difficult and not economical.

The silanes operable in this procedure are well known in the art and many can be obtained commercially. Examples of silanes are $CH_2=CHSiCl_3$,

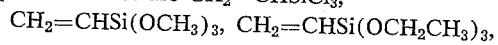

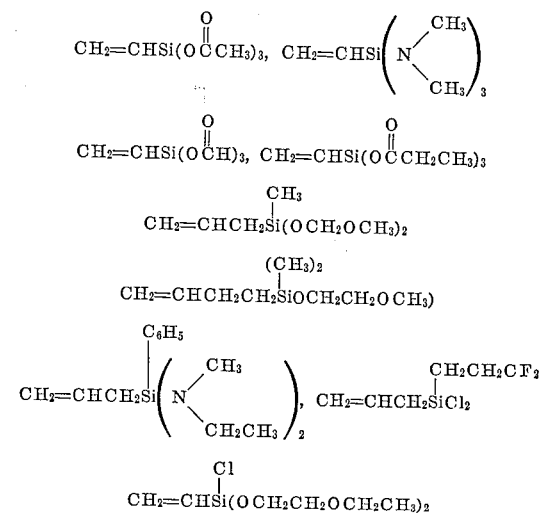

The silicon hydride polysiloxanes operable in this procedure can be obtained commercially and are well known in the art. Examples of silicon hydride polysiloxanes are

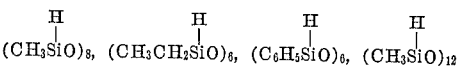

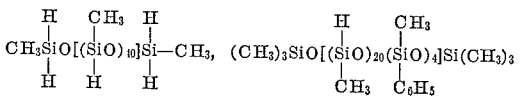

and any other combination of siloxane units such as $(CH_3)_2SiO$,

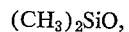

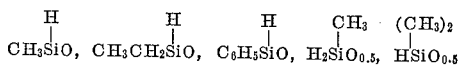

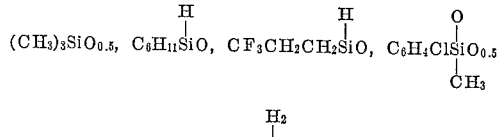

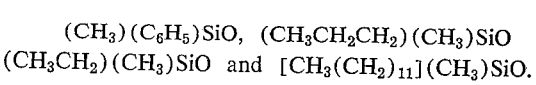

$(CH_3)(C_6H_5)SiO$, $(CH_3CH_2CH_2)(CH_3)SiO$
$(CH_3CH_2)(CH_3)SiO$ and $[CH_3(CH_2)_{11}](CH_3)SiO$.

The platinum catalyst can be in any form which is not basic in nature, such as platinum on charcoal and platinum on alumina. The platinum catalyst should at all times contain as little water as possible, this is particularly important when a small quantity of silane is used. Any platinum catalyst which is basic will reduce the yield of product and will produce polymers other than those described by this invention.

The mixture of platinum catalyst and silicon hydride polysiloxane is usually preheated to a temperature of 110° to 160° C., preferably 120° to 150° C. before the addition of the silane. These preheating temperatures are not critical. The mixture need not be preheated before the addition of the silane, but because the reaction is usually exothermic and substantially begins at about 110° to 120° C., preheating is advantageous. When small quantities of silane are used, preheating is usually not necessary, but as larger quantities are used preheating becomes very desirable. The reaction is vigorous and the silanes being relatively low boiling can cause the system to build up pressure and/or cause flooding in open systems. The silane is thus usually added at a rate which is inversely proportional to the quantity of silane to be added. The mixture is usually agitated during the addition. After the addition is completed the mixture is raised to a temperature of 200° to 220° C. to insure completion of the reaction and then cooled to room temperature or to some temperature less than 200° C. when the reaction is vacuum stripped.

The entire procedure is best conducted in the absence of moisture. Although this is not an absolute requirement, the yields are higher and the product purer when no moisture is present. Reasonable product yields can be obtained when only a minimum of preventive measures are used to keep the system dry. Also the best results are obtained when the system is blanketed with an inert gas such as nitrogen. Some oxidation can occur at the reaction temperatures although systems in which an inert gas is not used usually have an insignificant amount of oxidation.

The silane and silicon hydride polysiloxane do not require a solvent for carrying out the reaction, but an organic solvent can be used. When the silicon hydride polysiloxane is of a high molecular weight, a solvent solution of the silicon hydride polysiloxane and/or silane is particularly advantageous as the viscosity of the system will be reduced and handling properties are improved. The organic solvent should be essentially water-free, should not contain reactive groups such as hydroxyl radicals, and should permit the temperature of reaction to be reached. The higher temperatures can be reached either with higher boiling solvents or by using pressure.

Examples of some operable organic solvents are toluene, xylene, naptha, organic esters such as butyl, acetate, 2-ethylhexyl acetate, acetate of ethylene glycol monomethyl ether, acetate of ethylene glycol monobutyl ether, and organic ketones such as methylethyl ketone and methylhexyl ketone.

After the reaction mixture has cooled to room temperature, any remaining unreacted silanes and/or solvent can be removed by heat and vacuum stripping. The catalyst can be removed by filtering.

The siloxane copolymers of this invention have excellent shelf stabilities. Whereas, other reactive siloxanes gradually change in properties over a period of time these siloxane copolymers retain their properties such as viscosity whether they are stored with or without solvent, as long as the container is sealed against outside moisture. When removed from a sealed container, they will cure to usable products.

The siloxane copolymers can be made by varying viscosities and can be used with or without solvents. These siloxanes can also be made into stable emulsions.

An outstanding feature of these siloxane copolymers is that they can be used as a one-component water repellent. These siloxane copolymers are superior water repellents for fabrics and can be applied to fabrics from an organic solvent solution, an aqueous emulsion, a consumer aerosol package or a dry cleaning medium. All of these methods of application provide fabrics with good water repellency without the use of any curing catalyst and at room temperature. The water repellency produced on the fabric is durable and can withstand several washings. The water repellency and durability can be even further enhnaced by either heat-curing the fabric after application or by using a curing catalyst. A curing catalyst is particularly advantageous when the siloxane copolymers are used in a dry cleaning medium.

The siloxane copolymers used as a water repellent can be applied from a solvent solution using such solvents as toluene, perchloroethylene, hexane, acetone, isopropanol, ethanol and methanol. The fabric to be made water repellent can be dipped in the solvent solution of the siloxane copolymer, the solvent solution of the siloxane copolymer can be brushed on the fabric or applied in any other conventional manner. The amount of pickup of siloxane copolymer is preferably from 1 to 10 weight percent, with from 1 to 3 weight percent being a more commercially desirable range.

The siloxane copolymer can be applied to fabrics to provide water repellency from aqueous emulsion. The emulsions can be prepared in any conventional manner using nonionic, anionic or cationic surfactants. The nonionic surfactants are preferred. The most preferred surfactants are the reaction product of ethylene oxide and acetylenic glycol, known as Surfynol 465, made by Air Reduction Chemical Company, and trimethylnonylpolyethylene glycol ether, known as Tergitol TMN–6. The emulsion can be prepared to contain a wide concentration of siloxane copolymer. The most preferred concentration is from 5 to 40 weight percent siloxane copolymer. The emulsion can be applied to the fabric in any conventional manner. The fabric can be immersed in an emulsion, removed and dried. The water repellency is usually good when the amount of siloxane copolymer pickup by the fabric is from 0.5 to 10 weight percent with from 0.5 to 3 weight percent being a more commercially desirable range.

The siloxane copolymer can be applied on fabrics to provide water repellency by spraying from aerosol packages. The siloxane copolymer can be put into any conventional type of aerosol package which is substantially free from water. The siloxane copolymer can be in any suitable organic solvent usually used with aerosol sprays such as chlorothene or perchloroethylene. Conventional spray propellents, such as dichlorodifluoromethane, can be used. The amount of siloxane copolymer in the solvent solution is preferably from 1 to 20 weight percent. A spray of from 2 to 60 seconds on an area of 0.2 to 0.6 square feet provides a fabric with good water repellency. Usually only from 2 to 30 seconds is sufficient to get maximum protection.

The siloxane copolymers can be applied to fabrics with any conventional commercial dry cleaning medium. The siloxane copolymers of this invention are added to the conventional cleaning bath and this solution both cleans and treats the fabric making it water repellent. The commercial dry cleaning fluids and soaps can be used. The amount of siloxane copolymers used in the dry cleaning medium can be from 1 to 25 weight percent based on the total cleaning medium.

The siloxane copolymers are useful in making fabrics water repellent, such as cotton, sateen, viscose, glass, nylon, Dacron, acetate, arnel, cellulose triacetate, polyacrylonitrile (Orlon), synthetic polyesters of terephthalic acid and ethylene glycol; copolymers of acrylonitrile and vinylidene chloride (Dynel); copolymers of vinylchloride and vinylidene chloride; copolymers of vinylacetate and vinylchloride, wool and linen.

The siloxane copolymers are also useful as water repellents for paper, glass, wood, leather, masonry products and other substrates.

The most preferred siloxane copolymers which are useful for water repellents are siloxane copolymers of the general formula

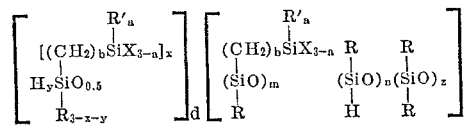

wherein R, R', X, a, b, x, y and d are defined above; $m$ has a value such that at least 2 mol percent of the silicon atoms have at least one $-(CH_2)_bSiR'_aX_{3-a}$ radical and not more than 35 mol percent of the silicon atoms have at least one $-(CH_2)_bSiR'_aX_{3-a}$ radical; $n$ has a value such that at least 32.5 mol percent of the silicon atoms have at least one hydrogen atom bonded to a silicon atom and not more than 98 mol percent of the silicon atoms have at least one hydrogen atom bonded to a silicon atom; $z$ has an average value of from 0 to a maximum value which is not more than the value of $n$; and the sum of $m+n+z$ is from 6 to 2000.

The siloxane copolymers are particularly useful for water repellents when the mol percent of the siloxane units having $-(CH_2)_bSiR'_aX_{3-a}$ radicals is from 2 to 35 mol percent, and when the number of $R_2SiO$ units does not exceed more than one-half the total number of $R_2SiO$ units and

units in the composition. The number of $R_2SiO$ units is not more than the number of

units, thus, $z$ cannot exceed $n$. The sum of $n+z$ must be such that it does not exceed 98 mol percent based on the total number of moles of siloxane units. These siloxane copolymers are particularly useful for fabrics and have commercially acceptable water repellency values.

The most preferred siloxane copolymers are those where R is methyl, R' is methyl, $b$ is 2, $a$ is 0 or 1, and the sum of $m+n+z$ is from 10 to 200. The best water repellency properties are obtained when $n$ has a value such that at least 5 mol percent of the silicon atoms have at least one $-(CH_2)_bSiR'_aX_{3-a}$ radical and not more than 20 mol percent of the silicon atoms have at least one $-(CH_2)_bSiR'_aX_{3-a}$ radical.

Although these siloxane copolymers have excellent water repellent properties, particularly some of the above preferred species, these siloxane copolymers have wide utility. These siloxanes can be used for fabric softeners and lubricants, paper release coatings, for adhesives, particularly those with high amounts of hydrolyzable group, for elastomeric products, resinous products and room temperature curing compositions.

Although these siloxane copolymers can be cured to durable films by curing at room temperature without a catalyst, catalyst and heat can be used for curing and under some conditions it can be advantageous. Fabrics which have been treated with siloxane copolymers of this invention can be cured by conventional ironing or pressing, particularly those which are treated by the dry cleaning process. Curing catalysts which can be used are, for example, amines such as primary amines, secondary amines, tertiary amines and aminoorganosilicon compounds. Organic amines are well known in the art and can be obtained commercially. Examples of aminoorganosilicon compounds are such as $(CH_3O)_3SiCH_2CH_2CH_2NHCH_2CH_2NH_2$
$(CH_3)_3SiCH_2CH_2CH_2NH_2$

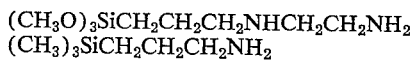

and

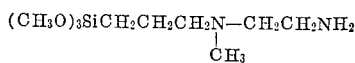

The curing catalysts are preferably metal carboxylates, organic esters of titanium and zirconium, and alkyl tin carboxylates. Examples of metal carboxylates are cadmium octoate, cadmium acetate, zinc octoate, potassium acetate, lead stearate, cobalt octoate, cobalt naphthenate, magnesium octoate, lead octoate, magnesium naphthenate and lead hexoate. Examples of organic esters of titanium and zirconium are tetraethyl titanate, tetraisopropyl titanate, tetraisopropyl zirconate, tetroctyl titanate, tetraoctadecyl zirconate, octylene glycol titanate, glycerol zirconate, triethanolamine titanate, titanium lactate and zirconium lactate.

Examples of the alkyl-tin-carboxylates are diethyl-tin-diacetate, tributyl - tin - propionate, dibutyl-tin-dilactate, butyl-tin-trioctoate, octadecyl-tin-diacetate, trimethyl-tin-stearate, dibutyl-tin-dibenzoate, and dibutyl-tin-diacetate.

The caalyst can be used in amounts normally used in curing hydrolyzable systems such as from 0.01 to 20 weight percent of the total weight of the siloxane copolymer.

The siloxane copolymers can be cured by heating either with or without catalyst. The temperatures can be from room temperature to 260° C. When heating is used it is preferred to heat at above 30° C. and preferably above 40° C. Heating the siloxane copolymers often shortens the curing time although better results can in some cases, be obtained by curing at room conditions.

The following examples are illustrative only and should not be construed as limiting the invention which is properly delineated in the appended claims.

EXAMPLE 1

A mixture of 60.0 g. of a trimethylsilyl-endblocked methylhydrogenpolysiloxane having a viscosity of 32.9 cs. at 25° C. and 0.2 g. of 1.0 weight percent platinum on charcoal was mixed in a reaction flask equipped with an agitator, a dropping funnel and a reflux condenser which is fitted with a drying tube and was preheated to 120° C. when the mixture reached a temperature of 120° C., 14.8 g. of $CH_2{=}CHSi(OCH_3)_3$ was added from the dropping funnel at a rate of 5 g. per minute. The temperature was maintained between 120° and 140° C. during the addition. After the addition of the silane the temperature was raised to 210° C. before cooling to 82° C. Any unreacted silane was removed by vacuum stripping at 82° C. and 1 mm. of Hg. The stripped product was vacuum filtered through a bed of exceptionally pure diatomaceous silica, known as Super-Cel made by Celite, providing 59.6 g. of product, which was a trimethylsilyl-endblocked siloxane copolymer having about 10 mol percent of the units of the unit formula

and 90 mol percent of the units of the unit formula

The product was soluble in toluene, acetone, hexane and isopropanol.

An emulsion was made from the above product by dissolving 20 g. of product in 20 g. of toluene and then slowly adding to this solution 40 ml. of an aqueous solution of 2 weight percent of trimethylnonylpolyethylene glycol ether, Tergitol TMN–6 and 2 weight percent of an anionic surfactant having 30–35 weight percent active ingredient and a pH of 8.6, while the solution was being mixed with a high speed homogenizer.

To 12 g. of the above emulsion, 185 ml. of water was added. This emulsion was then applied to 80 x 80 cotton print fabric by dipping and padding. The treated cotton fabric was then conditioned for 24 hours at 65% relative humidity at 21° C. After the conditioning the cotton fabric was spray rated by using the spray test as described in ASTM D–583–58, or the spray test of AATCC Standard Test Method 22–1961. The treated cotton fabric had a spray rating of 50 after 24 hours of conditioning. After an air cure of four days at room conditions, the spray rating increased to 70 and after 16 days of air cure at room conditions, the spray rating increased to 90. A spray rating of 80 to 90 was obtained when the treated and conditioned cotton fabric was cured by heating for 3 minutes at 176° C.

A solvent solution of the above product was made by dissolving 3.5 g. of the above siloxane copolymer in 120 ml. of perchloroethylene. This solution was applied to 80 x 80 cotton print fabric by dipping and padding. The treated fabric was conditioned as described above. After the conditioning the fabric had a spray rating of 80. After 4 days of air curing at room conditions the fabric had a spray rating of 90 to 100, and after 16 days of air curing the fabric had a spray rating of 100. After a 3-minute curing at 176° C. the treated and conditioned cotton fabric had a spray rating of 100.

Adding 0.7 g. of dibutyl-tin-diacetate to the above solution gave a spray rating of 100 after curing a treated and conditioned 80 x 80 cotton print fabric for 3 minutes at 176° C.

EXAMPLE 2

The procedure of Example 1 was used to prepare various siloxane copolymers. The procedure was the same except as indicated in the following table.

TABLE

| Run No. | Silane added | Grams of silane added | Grams of SiH containing polysiloxane of Example 1 added | Grams of 1 wt. percent Pt. on charcoal added | Temp. at which addition begins, °C. | Rate of addition of silane, g./min. | Temp. maintained during addition, °C. | Maximum temp. to which reaction mixture is raised, °C. | Conditions of stripping | Mol percent of siloxane units as indicated | Mol percent of siloxane units as indicated | Viscosity of product, cs. at 25° C. |
|---|---|---|---|---|---|---|---|---|---|---|---|---|
| 1 | CH$_2$=CHSi(OCH$_3$)$_3$ | 6.0 | 120.0 | 0.20 | 25 | (¹) | 25 | 210 | 115° C. at 1 mm. Hg | 2% OSiCH$_2$CH$_2$Si(OCH$_3$)$_3$ with CH$_3$ group | 98% OSiCH$_3$ with H | 40 |
| 2 | CH$_2$=CHSi(OCH$_3$)$_3$ | 14.8 | 120.0 | 0.20 | 25 | (¹) | 25 | 210 | 125° C. at 1 mm. Hg | 5% OSiCH$_2$CH$_2$Si(OCH$_3$)$_3$ with CH$_3$ | 95% OSiCH$_3$ with H | 43 |
| 3 | CH$_2$=CHSi(OCH$_3$)$_3$ | 29.6 | 60.0 | 0.20 | 120 | 5 | 120-140 | 210 | 104° C. at 3 mm. Hg | 20% OSiCH$_2$CH$_2$Si(OCH$_3$)$_3$ with CH$_3$ | 80% OSiCH$_3$ with H | 219 |
| 4 | CH$_2$=CHSi(OCH$_3$)$_3$ | 39.5 | 40.0 | 0.13 | 120 | 5 | 120-140 | 210 | 115° C. at 3 mm. Hg | 40% OSiCH$_2$CH$_2$Si(OCH$_3$)$_3$ with CH$_3$ | 60% OSiCH$_3$ with H | 435 |
| 5 | CH$_2$=CHSi(OCH$_3$)$_3$ | 59.2 | 40.0 | 0.13 | 120 | 2 | 120-140 | 210 | 97° C. at 3 mm. Hg | 58.5% OSiCH$_2$CH$_2$Si(OCH$_3$)$_3$ with CH$_3$ | 41.5% OSiCH$_3$ with H | 872 |
| 6 | CH$_2$=CHSi(OCH$_3$)$_3$ | 59.2 | 30.0 | 0.10 | 120 | 2 | 120-140 | 210 | 109° C. at 2 mm. Hg | 79.2% OSiCH$_2$CH$_2$Si(OCH$_3$)$_3$ with CH$_3$ | 20.8% OSiCH$_3$ with H | 1,122 |
| 7 | CH$_2$=CHSi(OCH$_3$)$_3$ | 74.0 | 30.0 | 0.10 | 120 | 2 | 120-140 | 210 | 125° C. at 3 mm. Hg | 84.3% OSiCH$_2$CH$_2$Si(OCH$_3$)$_3$ with CH$_3$ | 15.7% OSiCH$_3$ with H | 2,790 |
| 8 | CH$_2$=CHSi(OĊCH$_3$)$_3$ (O=) | 9.3 | ²120.0 | 0.10 | 130 | 5 | 130-140 | 205 | 126° C. at 3 mm. Hg | 2% OSiCH$_2$CH$_2$Si(OĊCH$_3$)$_3$ with CH$_3$, O= | 98% OSiCH$_3$ with H | 25 |
| 9 | CH$_2$=CHSi(OĊCH$_3$)$_3$ (O=) | 46.4 | ²120.0 | 0.10 | 155 | 5 | 140-155 | 215 | 120° C. at 9 mm. Hg | 7.9% OSiCH$_2$CH$_2$Si(OĊCH$_3$)$_3$ with CH$_3$, O= | 92.1% OSiCH$_3$ with H | 67 |
| 10 | CH$_2$=CHSi(OC$_2$H$_5$)$_3$ | 38.0 | ²120.0 | 0.10 | 133 | 6 | 120-133 | 208 | 135° C. at 5 mm. Hg | 10.0% OSiCH$_2$CH$_2$Si(OC$_2$H$_5$)$_3$ with CH$_3$ | 90% OSiCH$_3$ with H | 70 |
| 11 | CH$_3$=CHSi(OC$_2$H$_5$)$_2$ with CH$_3$ | 32.0 | ²120.0 | 0.10 | 138 | 6 | 138-200 | 212 | 140° C. at 5 mm. Hg | 7.5% OSiCH$_2$CH$_2$Si(OC$_2$H$_5$)$_2$ with CH$_3$, CH$_3$ | 92.5% OSiCH$_3$ with H | 70 |

¹ Immediate.  ² A trimethylsilyl endblocked methlhydrogen polysiloxane having a viscosity of 21.4 cs. at 25° C.

EXAMPLE 3

The spray ratings were determined as in Example 1 on 80 x 80 cotton print fabric treated as in Example 1 with a solution of 3.5 g. of the products from Example 2 in 120 ml. of perchloroethylene as indicated in the following table:

and after 1, 3 and 5 laundering cycles, as shown in the following table.

TABLE

| Run No. | Curing Conditions | Initial spray rating | Spray Ratings | | |
|---|---|---|---|---|---|
| | | | After 1 laundering | After 3 launderings | After 5 launderings |
| 2, Example 2 | 3 min. at 176° C | 90 | 70-80 | 70 | 70 |
| Example 1 | do | 100 | 90 | 80 | 70 |
| 3, Example 2 | do | 90 | 80 | 70 | 70 |
| 2, Example 2 | 16 days at room conditions | 90 | 70 | 70 | 50 |
| Example 1 | do | 100 | 70 | 50 | 50 |
| 3, Example 2 | do | 90 | 70 | 70 | 50 |

| Run No. from Example 2 | Spray rating after 16 days of air curing at room conditions | Spray rating after a 3 min. cure at 176° C. |
|---|---|---|
| 1 | 85 | 90 |
| 2 | 90 | 90 |
| 3 | 95 | 100 |
| 4 | 80 | 90 |
| 5 | 70 | 80 |
| 6 | 50 | 70 |
| 7 | 50 | 70 |

EXAMPLE 4

The spray ratings as shown in the following tables, were determined as in Example 1 on 80 x 80 cotton print fabric treated as in Example 1 with a solution of 3.5 g. of the products from Example 2 and 0.7 g. of dibutyl-tin-diacetate in 120 ml. of perchloroethylene each having been cured for 3 minutes at 176° C. after a conditioning of 24 hours at 65% relative humidity and 21° C.

Run No. from Example 2: Spray rating
1 ---------------------------------------- 100
2 ---------------------------------------- 100
3 ---------------------------------------- 100
4 ---------------------------------------- 80
5 ---------------------------------------- 75
6 ---------------------------------------- 70
7 ---------------------------------------- 75

EXAMPLE 5

The durability of the treated fabrics were determined by observing the water repellency as indicated by the spray rating after a specified number of launderings. The treated fabrics were laundered in a Westinghouse Automatic Home Washer with a 40-minute wash cycle, followed by drying in a Westinghouse Home Tumble Drier with a 20-minute cycle. Each washing and drying was considered as one laundering cycle. The washing medium consisted of about 8 gallons of 71° C. water and 8 g. of a commercial anionic washing detergent. Each piece of 80 x 80 cotton print fabric was treated with the siloxane copolymers in perchloroethylene as in Example 1. No curing catalyst was used. The spray ratings were determined before laundering

EXAMPLE 6

The durability was determined as in Example 5 on the same type of treated fabric except that 0.7 g. of dibutyl-tin-diacetate was added as a curing catalyst.

TABLE

| Run No. | Curing Conditions | Initial spray rating | Spray Ratings | | |
|---|---|---|---|---|---|
| | | | After 1 laundering | After 3 launderings | After 5 launderings |
| 2, Example 2 | 3 min. at 176° C | 100 | 80 | 70 | 50 |
| Example 1 | do | 100 | 80 | 70 | 50 |
| 3, Example 2 | do | 100 | 70 | 50-70 | 50 |
| 2, Example 2 | 16 days at room conditions | 100 | 70 | 50 | 0 |
| Example 1 | do | 85 | 70 | 50-70 | 0 |
| 3, Example 2 | do | 80 | 70 | 50 | 50 |

EXAMPLE 7

The following table shows the results of fabric treated with siloxane copolymers of this invention. The fabrics were treated with a solution of 3.5 g. of the siloxane copolymer, as indicated in 120 ml. of perchloroethylene. The fabrics were treated by the procedure as defined in Example 1. Prior to the spray rating determination, each piece of treated fabric was conditioned and cured for 3 minutes at 176° C. as in Example 1.

| Run No. | Spray Rating | |
|---|---|---|
| | Tan Sateen fabric | 80 x 80 cotton print fabric |
| 8, Example 2 | 90-100 | 90 |
| 9, Example 2 | 100 | 100 |
| 10, Example 2 | 70 | 70 |
| 11, Example 2 | 70 | 70 |

EXAMPLE 8

The siloxane copolymer was added to a dry cleaning composition to add water repellency to a fabric as it was being cleaned. The dry cleaning solution consisted of 1600 ml. perchloroethylene, 4.0 g. of a dry cleaning composition which consists of 8.95 weight percent of a polyglycol of the formula $HO(C_2H_4O)_sC_2H_4OH$ where $s$ has an average value of 7.7, 80.50 weight percent of sodium petroleum sulfonate and 10.55 weight percent of perchloroethylene. the composition is known as Norg Chlor made by the Dow Chemical Company, and 27 g. of the siloxane copolymer product of Example 2, Run No. 8. Each fabric received a 30 minute wash in the above dry cleaning solution. Water repellency was best achieved when the fabrics were dried for 3 minutes at 176° C., although just allowing the fabrics to drip dry did induce water repellency.

Fabric dry cleaned: Spray rating, after drying for 3 min. at 176° C.
Black wool flannel ---------------------------- 90
Olive drab twill ---------------------------- 70
50/50 acetate-viscose ---------------------------- 80
80 x 80 cotton print fabric ---------------------------- 70
Tan sateen ---------------------------- 50-70

EXAMPLE 9

Solutions were prepared for a spray treatment of fabric to give the fabrics a water repellent property. One solution was composed of 10 g. of the siloxane copolymer of Example 2, Run No. 8, and 130 g. of perchloroethylene. Another solution was composed of 10 g. of the same siloxane copolymer and 130 g. of chlorothene. Each of the solutions were sprayed on tan sateen fabric from a DeVilbiss Type EGA paint sprayer from 9 to 12 inches distance. About 30 to 50 percent of the spray was effectively absorbed by the fabric. Each of the fabrics were dried for 30 minutes at 26° C. to 37° C. after having been sprayed. The following table provides the results obtained.

| Solvent solution | Spray time (sec.) | G. of siloxane copolymer sprayed | Spray rating | |
|---|---|---|---|---|
| | | | Sprayed side | Back side |
| Perchloroethylene | 60 | 2 | 100 | 50 |
| Do | 90 | 3 | 100 | 50 |
| Chlorothene | 60 | 2 | 90–100 | 70 |
| Do | 90 | 3 | 100 | 80 |

EXAMPLE 10

The siloxane copolymer of Example 2, Run No. 8, was used in a water repellent treatment of fabric from a conventional 16 oz. consumer type aerosol package formulation C being in an 8 oz. package. Three formulations were prepared and placed in aerosol packages.

(A) 25 g. of the siloxane copolymer of Example 2, Run No. 8
285 g. of chlorothene
190 g. dichlorodifluoromethane (B) 50 g. of the siloxane copolymer of Example 2, Run No. 8
260 g. of chlorothene
190 g. of dichlorodifluoromethane

TABLE

| Formulation: | Time (sec.) | Siloxane sprayed | Spray rating | | | |
|---|---|---|---|---|---|---|
| | | | 45 min. drying at 26° C. | | 5 days at room conditions | |
| | | | Sprayed side | Back side | Sprayed side | Back side |
| A | 5 | 0.26 | 80–90 | 70 | 90 | 80 |
| | 10 | 0.50 | 90 | 70 | 110 | 80 |
| | 20 | 0.79 | 90 | 90 | 100 | 100 |
| | 30 | 1.00 | 90–100 | 90 | 100 | 100 |
| B | 5 | 0.50 | 100 | 80 | 90 | 90 |
| | 10 | 1.00 | 90 | 90 | 90 | 90 |
| | 20 | 1.60 | 90 | 90 | 100 | 90 |
| | 30 | 2.00 | 80–90 | 90 | 90 | 90 |
| C | 5 | 0.89 | 100 | 70 | 100 | 80 |
| | 10 | 2.10 | 90 | 90 | 90 | 90 |
| | 20 | 2.80 | 100 | 90 | 90 | 100 |

(C) 25 g. of the siloxane copolymer of Example 2, Run No. 8
79 g. of chlorothene
63 g. of dichlorodifluoromethane

TABLE

| Fabric treated | Grams of siloxane copolymer sprayed | Spray rating | | | |
|---|---|---|---|---|---|
| | | 60 min. drying at 26° C. | | 5 days at room conditions | |
| | | Sprayed side | Back side | Sprayed side | Back side |
| 80 x 80 cotton print | 0.20 | 100 | 80 | 100 | 80 |
| Glass, Stephens 444 | 0.27 | 100 | 100 | 100 | 100 |
| Tan sateen | 0.33 | 90 | 50 | 100 | 70 |
| Viscose | 0.57 | 90 | 80 | 100 | 90 |
| Nylon | 0.18 | 90 | 80 | 100 | 80 |
| Spun Arnel (No. 112) | 0.22 | 90 | 80 | 90 | 80 |
| Spun Acetate (No. 152) | 0.28 | 90 | 50 | 80 | 50 |
| Brown wool flannel | 0.32 | 80–90 | 80 | 80 | 80 |
| Spun Dacron (No. 64) | 0.47 | 80 | 70 | 80 | 50 |
| Red sateen | 0.32 | 80 | 50 | 80–90 | 50 |
| Olive drab twill | 0.31 | 70–80 | 50 | 80 | 70 |

Tan sateen fabric was sprayed with each of the formulations for varying times from a distance of one foot. About 70 to 80% of the spray was effectively absorbed by the fabric. The following table provides the results of the aerosol type spraying.

EXAMPLE 11

Various fabrics were treated by spraying with Formulation A of Example 10 from consumer type spray bombs. The following table shows the results obtained by using the procedure of Example 10. Each fabric was sprayed from 3 to 5 seconds from one foot distance.

EXAMPLE 12

When any of the following silanes and silicon hydride polysiloxanes are reacted in accordance with the procedure of Example 1, equivalent results are obtained.

TABLE

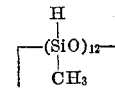

TABLE

| Silane | Silicon Hydride Polysiloxane | Moles of silane reacted with 1 mole of the silicon hydride polysiloxane |
|---|---|---|
| 3. $CH_2=CHCH_2\overset{\underset{\mid}{CH_2CH_2CF_3}}{Si}[N(CH_3)_2]_2$ | $H_2\overset{\underset{\mid}{C_6H_5}}{Si}O[(\overset{\underset{\mid}{H}}{Si}O)_{35}(\overset{\underset{\mid}{CH_3}}{\underset{\mid}{\underset{CH_2CH_2CF_3}{\mid}}{Si}}O)_6]\overset{\underset{\mid}{C_6H_5}}{\underset{\mid}{\underset{CH_2CH_2CF_3}{\mid}}{Si}}H_2$ | 8 |
| 4. $CH_2=CHCH_2CH_2\overset{\underset{\mid}{CH_3}}{\underset{\mid}{CH_3}}{Si}O\overset{O}{\overset{\|}{C}}H$ | $(CH_3)_3SiO(\overset{\underset{\mid}{H}}{\underset{\mid}{CH_3}}{Si}O)_{2,000}Si(CH_3)_3$ | 340 |
| 5. $CH_2=CHCH_2Si\left(N\begin{smallmatrix}CH_3\\ \\CH_2CH_3\end{smallmatrix}\right)_3$ | $H_2\overset{\underset{\mid}{C_6H_{11}}}{Si}O[(\overset{\underset{\mid}{H}}{\underset{\mid}{CH_3}}{Si}O)_{12}(\overset{\underset{\mid}{CH_2CH_3}}{\underset{\mid}{CH_3}}{Si}O)_{88}]\overset{\underset{\mid}{C_6H_{11}}}{Si}H_2$ | 2 |
| 6. $CH_2=CH\overset{\underset{\mid}{C_6H_{11}}}{Si}Cl_2$ | $CH_3\overset{\underset{\mid}{(C_6H_5)_2}}{Si}O---[(\overset{\underset{\mid}{H}}{\underset{\mid}{CH_3}}{Si}O)_{50}(\overset{\underset{\mid}{CH_3}}{\underset{\mid}{CH_3}}{Si}O)_{25}]\overset{\underset{\mid}{(C_6H_5)_2}}{Si}CH_3$ | 25 |
| 7. $CH_2=CHSi(O\overset{O}{\overset{\|}{C}}CH_2CH_3)_3$ | $(CH_3)_3SiO(\overset{\underset{\mid}{H}}{\underset{\mid}{CH_3}}{Si}O)_6Si(CH_3)_3$ | 4 |
| 8. $CH_2=CHCH_2\overset{\underset{\mid}{CH_2CH_3}}{Si}(OCH_2CH_2CH_3)_2$ | $\left[(\overset{\underset{\mid}{H}}{\underset{\mid}{CH_2CH_2CF_3}}{Si}O)_9(\overset{\underset{\mid}{CH_3}}{\underset{\mid}{C_6H_5}}{Si}O)_4\right]$ | 6 |
| 9. $CH_2=CH\overset{\underset{\mid}{C_6H_4Cl}}{\underset{\mid}{Cl}}{Si}OCH_3$ | Siloxane copolymer having 50 mol percent $(CH_3\overset{\underset{\mid}{H}}{Si}O)$ units 20 mol percent $(C_6H_5\overset{\underset{\mid}{H}}{Si}O)$ units; 25 mol percent $(CH_3)_2SiO$ units; and 5 mol percent $(CH_3)_3SiO_{0.5}$ units. | [1] 15 |
| 10. $CH_2=CH\overset{\underset{\mid}{CH_3}}{Si}(O\overset{O}{\overset{\|}{C}}CH_2CH_2CH_3)_2$ | $CH_3\overset{\underset{\mid}{H}}{\underset{\mid}{(CH_2)_{11}CH_3}}{Si}O---[(\overset{\underset{\mid}{H}}{\underset{\mid}{CH_3}}{Si}O)_{25}(\overset{\underset{\mid}{CH_3}}{\underset{\mid}{CH_3}}{Si}O)_5]\overset{\underset{\mid}{H}}{\underset{\mid}{(CH_2)_{11}CH_3}}{Si}CH_3$ | 4 |

[1] Mol percent.

EXAMPLE 13

When a solution of the siloxane copolymer of Example 1 and perchloroethylene as described in Example 1 is applied to paper, leather, wood, concrete building blocks, cement floors and fiber board, a water repellent product is formed when air dried.

EXAMPLE 14

When an aqueous emulsion of the siloxane copolymer of Example 2, Run No. 8 is emulsified as described in Example 1, and applied to paper, leather, wood, concrete building blocks, and fiber board, a water repellent product is formed when cured by heating to 100° C.

EXAMPLE 15

When dibutylamine, hexylenediamine, triethanolamine, cobalt naphthenate, magnesium octoate, zinc octoate, tetraisopropyl titanate, tetraoctadecyl zirconate, zirconium lactate, tributyltin propionate, or dibutyltin dibenzoate are substituted for dibutyltin diacetate of Example 4, equivalent results are obtained.

EXAMPLE 16

When paper, leather, fiber board or concrete building blocks are sprayed with the mist as described in Example 10, Formulation A and then cured by heating at 30° C. for one hour, the substrates have water repellent properties.

EXAMPLE 17

When the dry cleaned olive drab twill of Example 8 is heated to 260° C. for one minute equivalent results are obtained.

That which is claimed is:

1. In a process for rendering a substrate water repellent, the improvement comprising treating said substrate with a siloxane copolymer of the general formula

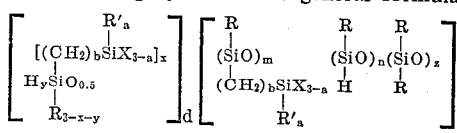

wherein R is a monovalent radical selected from the group consisting of alkyl radicals having from 1 to 12 inclusive carbon atoms, halogenated alkyl radicals having from 3 to 12 inclusive carbon atoms, phenyl radicals and halogenated phenyl radicals; R' is a monovalent radical selected from the group consisting of alkyl radicals having from 1 to 8 inclusive carbon atoms, halogenated alkyl radicals having from 3 to 8 inclusive carbon atoms, phenyl radicals and halogenated phenyl radicals; X is a monovalent radical selected from the group consisting of —OR" radicals, chlorine atoms, —NR"$_2$ radicals, —O(CH$_2$)$_c$OR" radicals,

radicals and

radicals wherein each R" is a monovalent alkyl radical having from 1 to 3 inclusive carbon atoms, and $c$ has a value of from 1 to 3 inclusive; $a$ has an average value of from 0 to 2 inclusive; $b$ has a value from 2 to 4 inclusive; $m$ has a value such that at least 2 mol percent of the silicon atoms have at least one

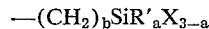

radical and not more than 90 mol percent of the silicon atoms have at least one —(CH$_2$)$_b$SiR'$_a$X$_{3-a}$ radical; $n$ has a value such that at least 10 mol percent of the silicon atoms have at least one hydrogen bonded to a silicon atom and not more than 98 mol percent of the silicon atoms have at least one hydrogen atom bonded to a silicon atom; $z$ has an average value of from 0 to a maximum value which is such that not more than 88 mol percent of the silicon atoms have two R radicals per silicon atom; the sum of $m+n+z$ is from 6 to 2000; $x$ has an average value of from 0 to 2 inclusive; $y$ has an average value of from 0 to 2 inclusive; the sum of $x+y$ is from 0 to 2 inclusive; and $d$ has a value of from 0 to 2 inclusive, and thereafter curing the treated substrate.

2. The process in accordance with claim 1 wherein the treated substrate is cured by exposing said treated substrate to air.

3. The process in accordance with claim 1 wherein the substrate is a fabric.

4. The process in accordance with claim 2 wherein the substrate is treated with a solution comprising the siloxane copolymer in an organic solvent.

5. The process in accordance with claim 2 wherein the substrate is treated with an aqueous emulsion comprising the siloxane copolymer, organic solvent, surfactant and water.

6. The process in accordance with claim 2 wherein the substrate is treated with a mist comprising the siloxane copolymer and an organic solvent.

7. The process in accordance with claim 3 wherein the fabric is treated with an organic solvent solution of the siloxane copolymer.

8. The process in accordance with claim 3 wherein the fabric is treated with an aqueous emulsion comprising water, the siloxane copolymer and a surfactant.

9. The process in accordance with claim 3 wherein the fabric is treated with a mist comprising the siloxane copolymer and an organic solvent.

10. The process in accordance with claim 7 wherein the treated fabric is cured by exposing the treated fabric to air.

11. In a process for rendering a fabric water repellent, the improvement comprising immersing the fabric in a solution comprising an organic solvent and a siloxane copolymer of the general formula

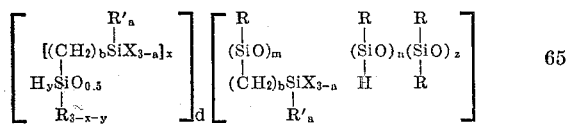

wherein R is a monovalent radical selected from the group consisting of alkyl radicals having from 1 to 12 inclusive carbon atoms, halogenated alkyl radicals having from 3 to 12 inclusive carbon atoms, phenyl radicals and halogenated phenyl radicals; R' is a monovalent radical selected from the group consisting of alkyl radicals having from 1 to 8 inclusive carbon atoms, halogenated alkyl radicals having from 3 to 8 inclusive carbon atoms, phenyl radicals and halogenated phenyl radicals; X is a monovalent radical selected from the group consisting of —OR" radicals, chlorine atoms, —NR"$_2$ radicals, —O(CH$_2$)$_c$OR" radicals,

radicals and

radicals wherein each R" is a monovalent alkyl radical having from 1 to 3 inclusive carbon atoms, and $c$ has a value of from 1 to 3 inclusive; $a$ has an average value of from 0 to 2 inclusive; $b$ has a value from 2 to 4 inclusive; $m$ has a value such that at least 2 mol percent of the silicon atoms have at least one —(CH$_2$)$_b$SiR'$_a$X$_{3-a}$ radical and not more than 90 mol percent of the silicon atoms have at least one —(CH$_2$)$_b$SiR'$_a$X$_{3-a}$ radical; $n$ has a value such that at least 10 mol percent of the silicon atoms have at least one hydrogen bonded to a silicon atom and not more than 98 mol percent of the silicon atoms have at least one hydrogen atom bonded to a silicon atom; $z$ has an average value of from 0 to a maximum value which is such that not more than 88 mol percent of the silicon atoms have two R radicals per silicon atom; the sum of $m+n+z$ is from 6 to 2000; $x$ has an average value of from 0 to 2 inclusive; the sum of $x+y$ is from 0 to 2 inclusive; and $d$ has a value of from 0 to 2 inclusive, and thereafter drying said fabric by exposing said fabric to air.

12. In a process for rendering a fabric water repellent, the improvement comprising immersing the fabric in an aqueous emulsion comprising water, a surfactant and a siloxane copolymer of the general formula

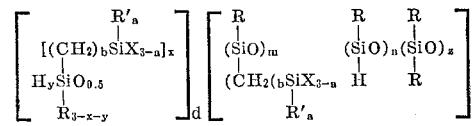

wherein R is a monovalent radical selected from the group consisting of alkyl radicals having from 1 to 12 inclusive carbon atoms, halogenated alkyl radicals having from 3 to 12 inclusive carbon atoms, phenyl radicals and halogenated phenyl radicals; R' is a monovalent radical selected from the group consisting of alkyl radicals having from 1 to 8 inclusive carbon atoms, halogenated alkyl radicals having from 3 to 8 inclusive carbon atoms, phenyl radicals and halogenated phenyl radicals; X is a monovavlent radical selected from the group consisting of —OR$_2$' radicals, chlorine atoms, —NR"$_2$ radicals, —O(CH$_2$)$_c$OR" radicals,

radicals and

radicals wherein each R" is a monovalent alkyl radical having from 1 to 3 inclusive carbon atoms, and $c$ has a value of from 1 to 3 inclusive; $a$ has an average value of from 0 to 2 inclusive; $b$ has a value from 2 to 4 inclusive; $m$ has a value such that at least 2 mol percent of the silicon atoms have at least one —(CH$_2$)$_b$SiR'$_a$X$_{3-a}$ radical and not more than 90 mol percent of the silicon atoms have at least one —(CH$_2$)$_b$SiR'$_a$X$_{3-a}$ radical; $n$ has a value such that at least 10 mol percent of the silicon atoms have at least one hydrogen bonded to a silicon atom and not more than 98 mol percent of the silicon atoms have at least one hydrogen atom bonded to a silicon atom; $z$ has an average value of from 0 to a maximum value which is such that not more than 88 mol percent of the silicon atoms have two R radicals per silicon atom; the sum of $m+n+z$ is from 6 to 2000; $x$ has an average value of from 0 to 2 inclusive; $y$ has an average value of from 0 to 2 inclusive; the sum of $x+y$ is from 0 to 2 inclusive; and $d$ has a value of from 0 to 2 inclusive, and thereafter drying said fabric by exposing said fabric to air.

13. In a progress for rendering a fabric water repellent, the improvement comprising spraying the fabric with a mist comprising an organic solvent and a siloxane copolymer of the general formula

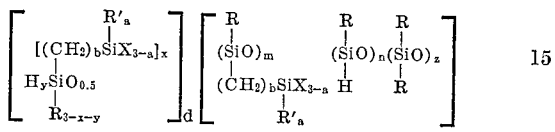

wherein R is a monovalent radical selected from the group consisting of alkyl radicals having from 1 to 12 inclusive carbon atoms, halogenated alkyl radicals having from 3 to 12 inclusive carbon atoms, phenyl radicals and halogenated phenyl radicals; R' is a monovalent radical selected from the group consisting of alkyl radicals having from 1 to 8 inclusive carbon atoms, halogenated alkyl radicals having from 3 to 8 inclusive carbon atoms, phenyl radicals and halogenated phenyl radicals; X is a monovalent radical selected from the group consisting of —OR'' radicals, chlorine atoms, —NR''$_2$ radicals, —O(CH$_2$)$_c$OR'' radicals,

radicals and

radicals wherein each R'' is a monovalent alkyl radical having from 1 to 3 inclusive carbon atoms, and $c$ has a value of from 1 to 3 inclusive; $a$ has an average value of from 0 to 2 inclusive; $b$ has a value of from 2 to 4 inclusive; $m$ has a value such that at least 2 mol percent of the silicon atoms have at least one —(CH$_2$)$_b$SiR'$_a$X$_{3-a}$ radical and not more than 90 mol percent of the silicon atoms have at least one —(CH$_2$)$_b$SiR'$_a$X$_{3-a}$ radical; $n$ has a value such that at least 10 mol percent of the silicon atoms have at least one hydrogen bonded to a silicon atom and not more than 98 mol percent of the silicon atoms have at least one hydrogen atom bonded to a silicon atom; $z$ has an average value of from 0 to a maximum value which is such that not more than 88 mol percent of the silicon atoms have two R radicals per silicon atom; the sum of $m+n+z$ is from 6 to 2000; $x$ has an average value of from 0 to 2 inclusive; $y$ has an average value of from 0 to 2 inclusive; the sum of $x+y$ is from 0 to 2 inclusive; and $d$ has a value of from 0 to 2 inclusive, from an aerosol spray package, and thereafter drying said fabric by exposing the fabric to air.

14. In a process for rendering a fabric water repellent, the improvement comprising washing the fabric in a dry cleaning medium comprising a dry cleaning soap, a dry cleaning solvent and a siloxane copolymer of the general formula

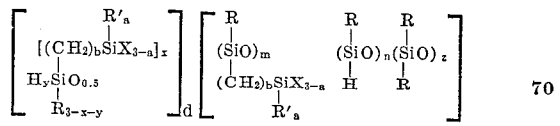

wherein R is a monovalent radical selected from the group consisting of alkyl radicals having from 1 to 12 inclusive carbon atoms, halogenated alkyl radicals having from 3 to 12 inclusive carbon atoms, phenyl radicals and halogenated phenyl radicals; R' is a monovalent radical selected from the group consisting of alkyl radicals having from 1 to 8 inclusive carbon atoms, halogenated alkyl radicals having from 3 to 8 inclusive carbon atoms, phenyl radicals and halogenated phenyl radicals; X is a monovalent radical selected from the group consisting of —OR'' radicals, chlorine atoms, —NR''$_2$ radicals, —O(CH$_2$)$_c$OR'' radicals,

radicals and

radicals wherein each R'' is a monovalent alkyl radical having from 1 to 3 inclusive carbon atoms, and $c$ has a value of from 1 to 3 inclusive; $a$ has an average value of from 0 to 2 inclusive; $b$ has a value from 2 to 4 inclusive; $m$ has a value such that at least 2 mol percent of the silicon atoms have at least one

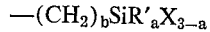

radical and not more than 90 mol percent of the silicon atoms have at least one —(CH$_2$)$_b$SiR'$_a$X$_{3-a}$ radical; $n$ has a value such that at least 10 mol percent of the silicon atoms have at least one hydrogen bonded to a silicon atom and not more than 98 mol percent of the silicon atoms have at least one hydrogen atom bonded to a silicon atom; $z$ has an average value of from 0 to a maximum value which is such that not more than 88 mol percent of the silicon atoms have two R radicals per silicon atom; the sum of $m+n+z$ is from 6 to 2000; $x$ has an average value of from 0 to 2 inclusive; $y$ has an average value of from 0 to 2 inclusive; the sum of $x+y$ is from 0 to 2 inclusive; and $d$ has a value of from 0 to 2 inclusive, and thereafter drying the fabric by exposing the fabric to air.

15. In a process for rendering a substrate water repellent, the improvement comprising treating the substrate with a siloxane copolymer of the general formula

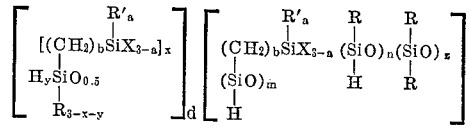

wherein R is a monovalent radical selected from the group consisting of alkyl radicals having from 1 to 12 inclusive carbon atoms, halogenated alkyl radicals having from 3 to 12 inclusive carbon atoms, phenyl radicals and halogenated phenyl radicals, R' is a monovalent radical selected from the group consisting of alkyl radicals having from 1 to 8 inclusive carbon atoms, halogenated alkyl radicals having from 3 to 8 inclusive carbon atoms, phenyl radicals and halogenated phenyl radicals; X is a monovalent radical selected from the group consisting of —OR'' radicals, chlorine atoms, —NR''$_2$ radicals, —O(CH$_2$)$_c$OR'' radicals,

radicals and

radicals wherein each R'' is a monovalent alkyl radical having from 1 to 3 inclusive carbon atoms, and $c$ has a value of from 1 to 3 inclusive; $a$ has an average value of from 0 to 2 inclusive, $b$ has a value from 2 to 4 inclusive; $m$ has a value such that at least 2 mol percent of the silicon atoms have at least one

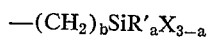

radical and not more than 35 mol percent of the silicon atoms have at least one —$(CH_2)_bSiR'_aX_{3-a}$ radical; $n$ has a value such that at least 32.5 mol percent of the silicon atoms have at least one hydrogen atom bonded to a silicon atom and not more than 98 mol percent of the silicon atoms have at least one hydrogen atom bonded to a silicon atom; $z$ has an average value of from 0 to a maximum value which is not more than the value of $n$; the sum of $m+n+z$ is from 6 to 2000; $x$ has an average value of from 0 to 2 inclusive; $y$ has an average value of from 0 to 2 inclusive; the sum of $x+y$ is from 0 to 2 inclusive; and $d$ has a value of from 0 to 2 inclusive, and thereafter curing said treated substrate.

16. The process in accordance with claim 15 wherein the substrate is a fabric, the fabric is treated by immersing the fabric in an emulsion comprising water, the siloxane copolymer and a surfactant and the fabric is thereafter cured by exposing the fabric to air.

17. The process in accordance with claim 15 wherein the substrate is a fabric, the fabric is treated by spraying said fabric with a mist comprising an organic solvent and the siloxane copolymer and said fabric is thereafter cured by exposing said fabric to air.

18. The process in accordance with claim 15 wherein the substrate is a fabric, the fabric is treated by dipping the fabric in a solution comprising an organic solvent, the siloxane copolymer and a catalyst selected from the group consisting of metal carboxylates, alkyl tin carboxylates, organic amines, organosilicon amines, organic esters of titanium and organic esters of zirconium and the fabric is thereafter cured by heating to from 30° C. to 260° C.

19. In a process for rendering a fabric water repellent, the improvement comprising treating the fabric with a siloxane copolymer of the general formula

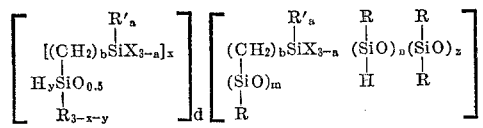

wherein R is a monovalent radical selected from the group consisting of alkyl radicals having from 1 to 12 inclusive carbon atoms, halogenated alkyl radicals having from 3 to 12 inclusive carbon atoms, phenyl radicals and halogenated phenyl radicals, R' is a monovalent radical selected from the group consisting of alkyl radicals having from 1 to 8 inclusive carbon atoms, halogenated alkyl radicals having from 3 to 8 inclusive carbon atoms, phenyl radicals and halogenated phenyl radicals; X is a monovlent radical selected from the group consisting of —OR'' radicals, chlorine atoms, —NR''$_2$ radicals, —O(CH$_2$)$_c$OR'' radicals,

radicals and

radicals wherein each R'' is a monovalent alkyl radical having from 1 to 3 inclusive carbon atoms, and $c$ has a value of from 1 to 3 inclusive; $a$ has an average value of from 0 to 2 inclusive, $b$ has a value from 2 to 4 inclusive; $m$ has a value such that at least 2 mol percent of the silicon atoms have at least one

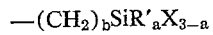

radical and not more than 35 mol percent of the silicon atoms have at least one —$(CH_2)_bSiR'_aX_{3-a}$ radical; $n$ has a value such that at least 32.5 mol percent of the silicon atoms have at least one hydrogen atom bonded to a silicon atom and not more than 98 mol percent of the silicon atoms have at least one hydrogen atom bonded to a silicon atom; $z$ has an average value of from 0 to a maximum value which is not more than the value of $n$; the sum of $m+n+z$ is from 6 to 2000; $x$ has an average value of from 0 to 2 inclusive; $y$ has an average value of from 0 to 2 inclusive; the sum of $x+y$ is from 0 to 2 inclusive; and $d$ has a value of from 0 to 2 inclusive, and thereafter drying said fabric by exposing the fabric to air.

20. The process in accordance with claim 19 wherein the fabric is immersed in a solution comprising an organic solvent and the siloxane copolymer.

21. The process in accordance with claim 19 wherein the fabric is treated by spraying the fabric with a mist comprising an organic solvent and the siloxane copolymer from an aerosol spray package.

22. The process in accordance with claim 19 wherein the fabric is treated by spraying the fabric with a mist comprising an organic solvent and the siloxane copolymer from an aerosol spray package and the fabric is thereafter dried by heating to from 30° C. to 260° C.

23. The process in accordance with claim 20 wherein the fabric is dried by heating above 30° C.

24. In a process for rendering a fabric water repellent, the miprovement comprising washing the fabric in a dry cleaning medium comprising a dry cleaning soap, a dry cleaning solvent and a siloxane copolymer of the general formula

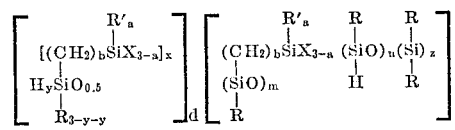

wherein R is a monovalent radical selected from the group consisting of alkyl radicals having from 1 to 12 inclusive carbon atoms, halogenated alkyl radicals having from 3 to 12 inclusive carbon atoms, phenyl radicals and halogenated phenyl radicals, R' is a monovalent radical selected from the group consisting of alkyl radicals having from 1 to 8 inclusive carbon atoms, halogenated alkyl radicals having from 3 to 8 inclusive carbon atoms, phenyl radicals and halogenated phenyl radicals; X is a monovalent radical selected from the group consisting of —OR'' radicals, chlorine atoms, —NR''$_2$ radicals, —O(CH$_2$)$_c$OR'' radicals,

radicals and

radicals wherein each R'' is a monovalent alkyl radical having from 1 to 3 inclusive carbon atoms, and $c$ has a value of from 1 to 3 inclusive; $a$ has an average value of from 0 to 2 inclusive, $b$ has a value from 2 to 4 inclusive; $m$ has a value such that at least 2 mol percent of the silicon atoms have at least one

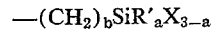

radical and not more than 35 mol percent of the silicon atoms have at least one —$(CH_2)_bSiR'_aX_{3-a}$ radical; $n$ has a value such that at least 32.5 mol percent of the silicon atoms have at least one hydrogen atom bonded to a silicon atom and not more than 98 mol percent of the silicon atoms have at least one hydrogen atom bonded to a silicon atom; $z$ has an average value of from 0 to a maximum value which is not more than the value of $n$; the sum of $m+n+z$ is from 6 to 2000; $x$ has an average value of from 0 to 2 inclusive; $y$ has an average value of from 0 to 2 inclusive; the sum of $x+y$ is from 0 to 2 inclusive; and $d$ has a value of from 0 to 2 inclusive, and thereafter drying the fabric by heating the fabric to from 30° C. to 260° C.

References Cited
UNITED STATES PATENTS

| | | | |
|---|---|---|---|
| 2,588,365 | 3/1952 | Dennett | 117—161 |
| 2,588,366 | 3/1952 | Dennett | 117—161 |
| 2,774,690 | 12/1956 | Cockett et al. | 117—161 |
| 2,807,601 | 9/1957 | Dennett | 117—161 |
| 2,833,022 | 5/1958 | Collings | 117—161 |
| 2,895,853 | 7/1959 | Bailey et al. | 117—161 |
| 2,905,703 | 9/1959 | Bailey et al. | 117—161 |
| 3,065,111 | 11/1962 | Reeves et al. | 117—135.5 |
| 3,123,494 | 3/1964 | Charreau | 117—161 |

WILLIAM D. MARTIN, *Primary Examiner.*

T. G. DAVIS, *Assistant Examiner.*

U.S. Cl. X.R.

117—123, 124, 141, 142, 143, 145, 148, 135.5, 155, 161; 260—29.2, 46.5